(12) United States Patent
Curnutt

(10) Patent No.: US 7,383,108 B1
(45) Date of Patent: Jun. 3, 2008

(54) VERTICAL ACCELERATION SENSING VEHICLE BRAKE SYSTEM

(76) Inventor: Charles R. Curnutt, 6175 Singing Sands Rd., Twnetynine Palms, CA (US) 92277

( * ) Notice: Subject to any disclaimer, the term of this patent is extended or adjusted under 35 U.S.C. 154(b) by 769 days.

(21) Appl. No.: 10/859,941

(22) Filed: Jun. 4, 2004

(51) Int. Cl.
*F16F 9/14* (2006.01)
*F16F 9/24* (2006.01)
*F16F 7/10* (2006.01)

(52) U.S. Cl. .................. 701/37; 188/284; 188/378; 188/297; 280/5.515; 267/64.15

(58) Field of Classification Search .............. 701/37; 188/284, 378, 297; 280/5.515; 267/64.15
See application file for complete search history.

(56) References Cited

U.S. PATENT DOCUMENTS

| 3,990,687 | A | | 11/1976 | Curnutt | |
|---|---|---|---|---|---|
| 4,210,344 | A | * | 7/1980 | Curnutt | 280/5.513 |
| 4,245,854 | A | | 1/1981 | Curnutt | |
| 5,190,126 | A | * | 3/1993 | Curnutt | 188/269 |

FOREIGN PATENT DOCUMENTS

| DE | 4219062 | A1 | * | 12/1993 |
|---|---|---|---|---|
| DE | 10306228 | A1 | * | 9/2004 |
| JP | 2005178533 | A | * | 7/2005 |

OTHER PUBLICATIONS

Parametric analysis of eddy-current brake performance by 3-D finite-element analysis, Gay, S.E.; Ehsani, M.; Magnetics, IEEE Transactions on, vol. 42, Issue 2, Part 2, Feb. 2006 pp. 319-328, Digital Object Identifier 10.1109/TMAG.2005.860782.*

(Continued)

*Primary Examiner*—Cuong H Nguyen
(74) *Attorney, Agent, or Firm*—Cislo & Thomas, LLP

(57) ABSTRACT

A vertical acceleration compensator is employed in the braking system of a vehicle wheel that undergoes vertical motion relative to the vehicle frame. The vertical acceleration compensator senses the vertical movement of the vehicle wheel relative to the vehicle frame and includes first and second component elements that form a variable volume compensation chamber. The vertical acceleration compensator is coupled in fluid communication with a brake fluid reservoir and a fluid actuated brake mechanism. The first and second compensator elements may be coupled to the vehicle wheel and to the vehicle frame. As a result, upward movement of the vehicle wheel relative to the vehicle frame reduces the volume of the compensation chamber, while downward movement of the vehicle wheel relative to the vehicle frame increases volume of the compensation chamber. A reduction in volume of the compensation chamber increases brake line pressure, thereby increasing the braking force on the wheel. Conversely, an expansion of volume of the compensation chamber reduces pressure in the brake line, thereby reducing the braking force on the wheel. The vertical acceleration compensator of the invention thereby automatically provides braking force compensation to a vehicle wheel traveling over a rough roadway or rough terrain.

20 Claims, 4 Drawing Sheets

OTHER PUBLICATIONS

The transient time domain analysis of non-linear electro-mechanical systems Smith, D.S.; Jenkins, M.K.; Howe, D.; Magnetics, IEEE Transactions on, vol. 30, Issue 5, part 2, Sep. 1994 pp. 3260-3263, Digital Object Identifier 10.1109/20.312633.*

Diagnostic End to End Monitoring & Fault Detection for Braking Systems, Murphy, B.J.; Lebold, M.S.; Banks, J.C.; Reichard, K.; Aerospace Conference, 2006 IEEE, Mar. 4-11, 2006 pp. 1-8, Digital Object Identifier 10.1109/AERO.2006.1656130.*

The power wheel—Electromotive torque for vehicular applications, Goldman, G.S.; Vehicular Technology Conference, 1978. 28th IEEE, vol. 28, Mar. 22-24, 1978 pp. 119-132.*

Energy-saving control of an unstable valve with a MR brake, QingHui Yuan; Li, P.Y.; American Control Conference, 2005. Proceedings of the 2005, Jun. 8-10, 2005 pp. 4375-4380 vol. 6, Digital Object Identifier 10.1109/ACC.2005.1470668.*

A power flow diagnostic framework for multi-domain dynamic systems with application to drive-by-wire ground vehicles Ganta, S.; Wagner, J.; American Control Conference, 2005. Proceedings of the 2005, Jun. 8-10, 2005 pp. 465-471.*

Torque control of electrorheological fluidic actuators for haptic vehicular instrument controls, Vitrani, M.A.; Nikitczuk, J.; Morel, G.; Mavroidis, B.; Robotics and Automation, 2004. Proceedings. ICRA '04. 2004 IEEE International Conference on vol. 1, 2004 pp. 764-769 vol. 1, Digital Object Identifier 10.1109/ROBOT.2004. 1307241.*

Electro-rheological fluidic actuators for haptic vehicular instrument controlsMelli-Huber, J.; Weinberg, B.; Fisch, A.; Nikitczuk, J.; Mavroidis, C.; Wampler, C.; Haptic Interfaces for Virtual Environment and Teleoperator Systems, 2003. HAPTICS 2003. Proceedings. 11th Symposium on,Mar. 22-23, 2003 pp. 262-269,Digital Object Identifier 10.11.*

Simulation of the dynamic performance of non-linear electromechanical systems, Smith, D.S.; Howe, D.; Computation in Electromagnetics, 1994. Second International Conference on, Apr. 12-14, 1994 pp. 24-27.*

* cited by examiner

VERTICAL ACCELERATION SENSING VEHICLE BRAKE SYSTEM

BACKGROUND OF THE INVENTION

1. Field of the Invention

The present invention relates to a system for sensing relative vertical movement between the wheels of a vehicle and the vehicle chassis or frame, and adjusting the braking force while applying the vehicle brakes to the vehicle wheels in response to that vertical movement.

2. Description of the Prior Art

When brakes are applied to a moving vehicle employing brake fluid in a fluid braking system, braking power is controlled in the first instance by means of a brake peddle or lever. That is, in a fluid braking system a brake fluid reservoir, namely the master brake cylinder, is connected by tubular brake lines to the brake cylinders at each wheel. Increased pressure within the closed brake line system forces the brake calipers toward a rotating disc or the brake shoes toward a brake lining. Pressure is increased in the brake system to cause a mechanical actuation of the calipers or brake shoes by depressing the brake peddle or lever so as to force a certain amount of brake fluid into the brake line, thereby increasing pressure in the line and actuating the brakes.

While the operator of the vehicle can generally determine the appropriate pressure to apply to the vehicle wheel brakes by resistance felt in depressing the brake actuator, there is normally a very rapid fluctuation in the appropriate braking force that should be applied due to relative vertical movement between the vehicle wheels and the frame or chassis of the vehicle. This fluctuation is particularly pronounced when the vehicle is traveling upon a rough surface.

When a brake is applied to a wheel of a vehicle rolling along a perfectly flat surface, the appropriate force to stop the wheel from turning is determined by the coefficient of friction between the area of contact of the vehicle wheel and the surface across which the wheel is traveling. The appropriate braking force is also governed by the vertical weight bearing down upon the wheel.

A simple illustration of this principal is apparent considering the difference in braking force required to stop an unloaded cargo vehicle as contrasted with the force required to stop the same vehicle fully loaded and traveling upon the same surface. Naturally, a much greater braking force is required to bring a heavily loaded vehicle to a halt than to halt the same vehicle traveling in an empty condition.

While a vehicle operator can sense the appropriate braking force to apply under differing conditions of vehicle load, there is another influence on the appropriate braking power to be applied which changes so rapidly that the vehicle operator cannot make timely adjustments to the braking force applied. Specifically, the traction of the vehicle wheel upon the roadway varies rapidly with the vertical movement of the wheel relative to the vehicle frame that occurs due to unevenness of the roadway. This variation of the appropriate braking force to be applied is particularly pronounced when the vehicle is traveling over a rough, bumpy roadway.

When a wheel travels over a depression in the roadway, the wheel normally drops vertically downwardly relative to the vehicle frame or chassis. As the wheel passes over a depression in the road, there is a momentary loss of contact, or at least a reduction of area of contact, between the wheel and the roadway. With the reduction in contact the braking force applied through the brake peddle or lever is momentarily excessive thus resulting in a tendency toward locking of the brake. Conversely, when the wheel crosses a raised bump in the road there is a slight movement of the wheel upwardly in a vertical direction relative to the vehicle chassis or frame. This produces a momentary increase in the vertical load on the wheel so that the applied braking force is momentarily less than optimum.

The small changes in relative movement between the vehicle wheel and the vehicle frame or chassis are far too rapid to allow compensation by the vehicle operator. Consequently, there is excessive wear on the vehicle tires and a loss in stopping force due to the repetitive momentary excessive and insufficient braking forces applied.

SUMMARY OF THE INVENTION

An object of the present invention is to provide a braking system that automatically provides appropriate adjustments in braking force due to relative vertical motion between a vehicle wheel and the frame or chassis upon which the wheel is mounted when applying the brakes to the wheel traveling on a surface. The vertical acceleration sensing and automatic brake adjustment system of the invention is particularly beneficial for vehicles that travel on rough roadways.

A further object of the invention is to provide a vertical acceleration-sensing vehicle brake system that automatically makes small adjustments in braking power in response to relative vertical acceleration of a vehicle wheel relative to the frame or chassis, both vertically upward and vertically downward.

A further object of the invention is to provide a vertical acceleration sensing vehicle brake system that can be incorporated into an existing brake system of a vehicle. That is, the improved braking control system of the invention may be easily retrofitted onto existing vehicles.

In one broad aspect the invention may be considered to be a vertical motion compensator for sensing vertical movement of a vehicle wheel relative to a vehicle frame and forming a variable volume compensation chamber coupled in fluid communication with a brake fluid reservoir and a fluid-actuated brake mechanism. The vertical motion compensator is coupled to both the vehicle wheel and to the vehicle frame in such a manner that upward movement of the vehicle wheel relative to the vehicle frame reduces volume of the variable volume compensation chamber. Conversely, downward movement of the vehicle wheel relative to the vehicle frame increases volume of the variable volume compensation chamber.

In a preferred embodiment of the invention the vertical motion or acceleration compensator is comprised of a first compensator element that is a movable compensator member joined to the vehicle wheel for vertical movement therewith. The vertical acceleration compensator is further comprised of a second compensator element that is a fixed compensator member anchored to the vehicle frame. Together the first and second compensator elements define the variable volume compensation chamber therebetween.

In another aspect the present invention may be considered to be a vertical acceleration compensator for sensing vertical movement of a vehicle wheel relative to a vehicle frame. The vertical acceleration compensator is coupled in fluid communication with a brake fluid reservoir and a fluid-actuated brake mechanism for a vehicle wheel.

The vertical acceleration compensator is comprised of a first compensation member defining a hollow cavity therewithin coupled in flow communication with the fluid-actuated brake mechanism, and a second compensation member that occupies a variable volume brake fluid portion of the hollow cavity. Also, a movable member is provided which is coupled to both the vehicle frame and the vehicle wheel. The moveable member is responsive to vertical movement of the vehicle wheel relative to the vehicle frame, to reciprocally move one of the first and second compensation members relative to the other.

This reciprocal motion contracts the variable volume brake fluid portion of the hollow cavity occupied by the second compensation member when the vehicle wheel moves vertically upwardly relative to the vehicle frame. By the same token, this movement expands the variable volume brake fluid portion of the hollow cavity occupied by the second compensation member when the vehicle wheel moves vertically downwardly relative to the vehicle frame.

The vertical acceleration compensator of the invention may take a number of different forms. In one preferred embodiment one of the compensation members is anchored to the vehicle frame and the movable member is a wheel mounting arm having opposing inboard and outboard ends. The outboard end of the wheel mounting arm carries the wheel. The other end, the inboard end of the wheel mounting arm, is attached to the vehicle frame for rotational movement relative thereto about a longitudinal axis that perpendicular to the orientation of the mounting arm. This longitudinal axis is parallel to the alignment of the vehicle and the direction of vehicle travel. The other of the compensation members is secured to the mounting arm at a spaced distance of separation from the longitudinal axis.

In some embodiments of the invention at least a portion of the hollow cavity is formed as a cylindrical chamber. The second compensation member includes a piston that is movable in vertical reciprocation within the hollow cylindrical chamber. A pair of flow communication ports may be formed in the first compensation member that defines the cavity within its structure. One of these flow communication ports is coupled to the brake fluid reservoir and the other flow communication port is coupled to the fluid-actuated brake.

In some embodiments of the invention a shock absorber is coupled to both the vehicle frame and the vehicle wheel. The second compensation member includes a piston located within the first compensation member. The first compensation member further defines a variable volume shock absorber fluid portion within the hollow cavity separated by the piston from the brake fluid portion of the hollow cavity. A shock absorber fluid line is coupled between the shock absorber and the shock absorber fluid portion of the hollow cavity in the first compensation member. In this arrangement relative vertical movement of the vehicle wheel to the vehicle frame causes an increase or decrease of fluid pressure within the shock absorber. This change in pressure is transmitted through the shock absorber fluid line to the vertical acceleration compensator of the invention.

The piston may be a free floating piston which moves reciprocally within a hollow component of the vertical acceleration compensator that is secured to the vehicle frame. The hollow component defines a variable volume shock absorber fluid cavity within its structure, as well as the variable volume brake fluid cavity. Reciprocal shifting of the piston in one direction acts to concurrently increase the volume of the shock absorber fluid cavity portion and decrease the volume of the brake fluid cavity portion of the hollow chamber with vertical movement of the wheel upwardly relative to the vehicle frame. Conversely, movement of the piston in the opposite direction increases the volume of the brake fluid cavity portion and reduces the volume of the shock absorber fluid cavity portion of the hollow chamber when the wheel moves vertically downwardly relative to the vehicle frame. In both instances the pressure to the brake actuating mechanism is increased or decreased as appropriate to maintain a proper braking force.

In certain preferred embodiments of the invention there is a mounting arm carrying the vehicle wheel relative to the frame. The mounting arm has in inboard end hinged to the vehicle frame for rotational movement relative thereto about a longitudinal axis perpendicular to the alignment of the mounting arm. The mounting arm has an outboard end upon which the vehicle wheel is carried. The movable compensator member is coupled to the mounting arm at a location thereon spaced outboard from the longitudinal axis. In this way the mounting arm acts as a lever arm, the movement of which alternatively urges the compensator members toward each other, or alternatively draws them apart.

One of the compensator members, either the first compensator member or the second compensator member may define the variable volume compensation chamber therewithin as a cylindrical cavity. The other of the compensator members may include a piston movable in reciprocation within the cylindrical cavity.

In still another aspect the invention may be considered to be a vehicle braking system with compensation for vertical movement of a vehicle wheel relative to a vehicle frame. The vehicle braking system of the invention is comprised of a closed fluid braking system, a vertical motion sensor, and hydraulic fluid. The closed fluid braking system includes a fluid reservoir mounted on the frame, a fluid-actuated brake mounted on the vehicle wheel, and a brake line connecting the fluid reservoir to the fluid-actuated brake. The fluid-actuated brake is applied by increased brake fluid pressure and released by decreased brake fluid pressure.

The vertical motion sensor may be comprised of a hollow structure having a fixed end secured to the vehicle frame and a opposite end coupled by a lever arm to the wheel to move vertically in response to vertical movement of the wheel relative to the vehicle frame. The vertical motion sensor defines within its structure a brake fluid cavity of volume that varies in response to relative movement of the opposite sensor end to the fixed sensor end. The brake fluid line is in fluid communication with the brake fluid cavity of the hollow structure.

The hydraulic fluid flows through the brake line between the reservoir and the brake and through the cavity of variable volume in the vertical motion sensor. With this construction pressure within the brake line decreases with increasing volume within the cavity and increases with decreasing volume with in the cavity.

The invention may be described with greater clarity and particularity by reference to the accompanying drawings.

DESCRIPTION OF THE DRAWINGS

FIG. 2A is a sectional elevational view of the vertical acceleration sensor employed in the embodiment of FIG. 1, shown in the condition in which the vehicle wheel has moved vertically upwardly relative to the vehicle frame.

DESCRIPTION OF THE EMBODIMENTS

Figure 1:
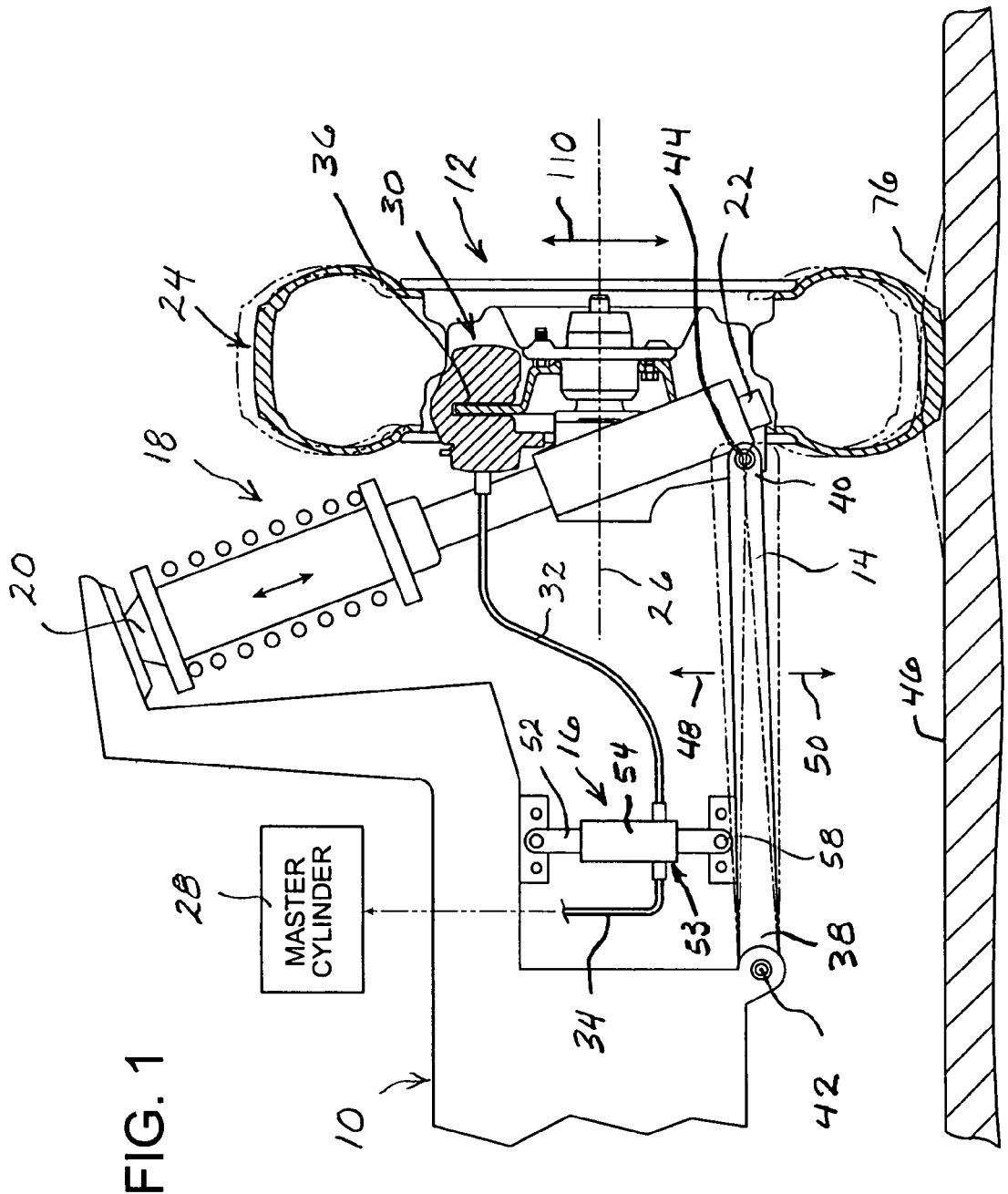
FIG. 1 is a diagrammatic, transverse, sectional, elevational view of a portion of a vehicle employing the vehicle braking system and vertical acceleration or motion sensor of the invention.

FIG. 1 illustrates a portion of an automotive vehicle having a conventional wheel mounting arrangement. Specifically, the vehicle includes a chassis or vehicle frame indicated generally at 10 and a vehicle wheel shown generally at 12 mounted to the vehicle frame 10 by means of a laterally extending wheel mounting arm 14. To clarify illustration of the operating features of the vertical acceleration sensor of the invention, only a single vehicle wheel 12 has been illustrated in FIG. 1, although it is to be understood that a typical automotive vehicle of the type depicted employs a plurality of vehicle wheels 12, each mounted on a separate mounting arm 14, as illustrated.

It is to be further understood that the vertical acceleration sensor of the invention has significant applicability not only to automotive vehicles having at least four wheels of the type illustrated in FIG. 1, but also to motorcycles and nonmotorized vehicles, such as bicycles. The operating principles of the vertical acceleration sensor are the same irrespective of the type of vehicle upon which it is employed.

In the embodiment illustrated in FIG. 1 the automotive vehicle is equipped with a vertical acceleration or motion sensor 16. The vehicle includes a conventional suspension system in which a shock absorber 18 is mounted with opposing ends 20 and 22 respectively coupled to the vehicle frame 10 and to the wheel 12 through an attachment to the mounting arm 14. The vehicle wheel 12 has a conventional pneumatic tire 24 on its rim and rotates relative to the vehicle frame 10 about an axis of rotation 26 that is perpendicular to the direction of vehicle travel.

The vehicle is equipped with a closed fluid braking system that includes a fluid reservoir, such as the master brake cylinder 28, mounted on the vehicle frame 10 and a fluid-actuated brake 30 mounted on the vehicle wheel 12. A narrow, tubular brake line having segments 32 and 34 in the embodiment illustrated connects the master cylinder fluid reservoir 28 to the brake 30 through the vertical acceleration or motion sensor 16.

In the embodiment illustrated the brake 30 is diagrammatically illustrated as having brake calipers that are forced toward each other by increased pressure in the brake line from fluid provided by the master cylinder 28 to exert a clamping force on the brake disc 36 that is secured to and rotates with the vehicle wheel 12. However, the invention is equally applicable to brakes having brake pads that are forced against a rotating brake drum, or any other conventional closed fluid braking system.

The mounting arm 14 is an elongated level arm with opposing inboard and outboard ends 38 and 40, respectively. The inboard end 38 of the mounting arm 14 is hinged to the vehicle frame 10 for movement in angular rotation about a longitudinal, fore and aft, horizontally oriented mounting arm axis of rotation 42. The axis of rotation 42 is oriented perpendicular to the wheel mounting arm 14. The opposite, outboard end 40 of the wheel mounting arm 14 is joined to the wheel assembly 12 at another rotatable connection 44. This arrangement allows the mounting arm 14 to move in relative rotation to the vehicle frame 10, yet allow the wheel 12 to be carried in an upright, vertical orientation perpendicular to the roadway 46 upon which the vehicle travels.

The mounting arm 14 extends laterally from the longitudinal mounting arm axis 42 and undergoes rotational movement relative to the vehicle frame 10, both in a vertical upward direction, as indicated by the directional arrow 48, and in a vertical downward direction, as indicated by the directional arrow 50. The mounting arm 14 moves in a vertical plane oriented perpendicular to the longitudinal mounting arm axis of rotation 42 and perpendicular to the roadway 46.

Figure 2:
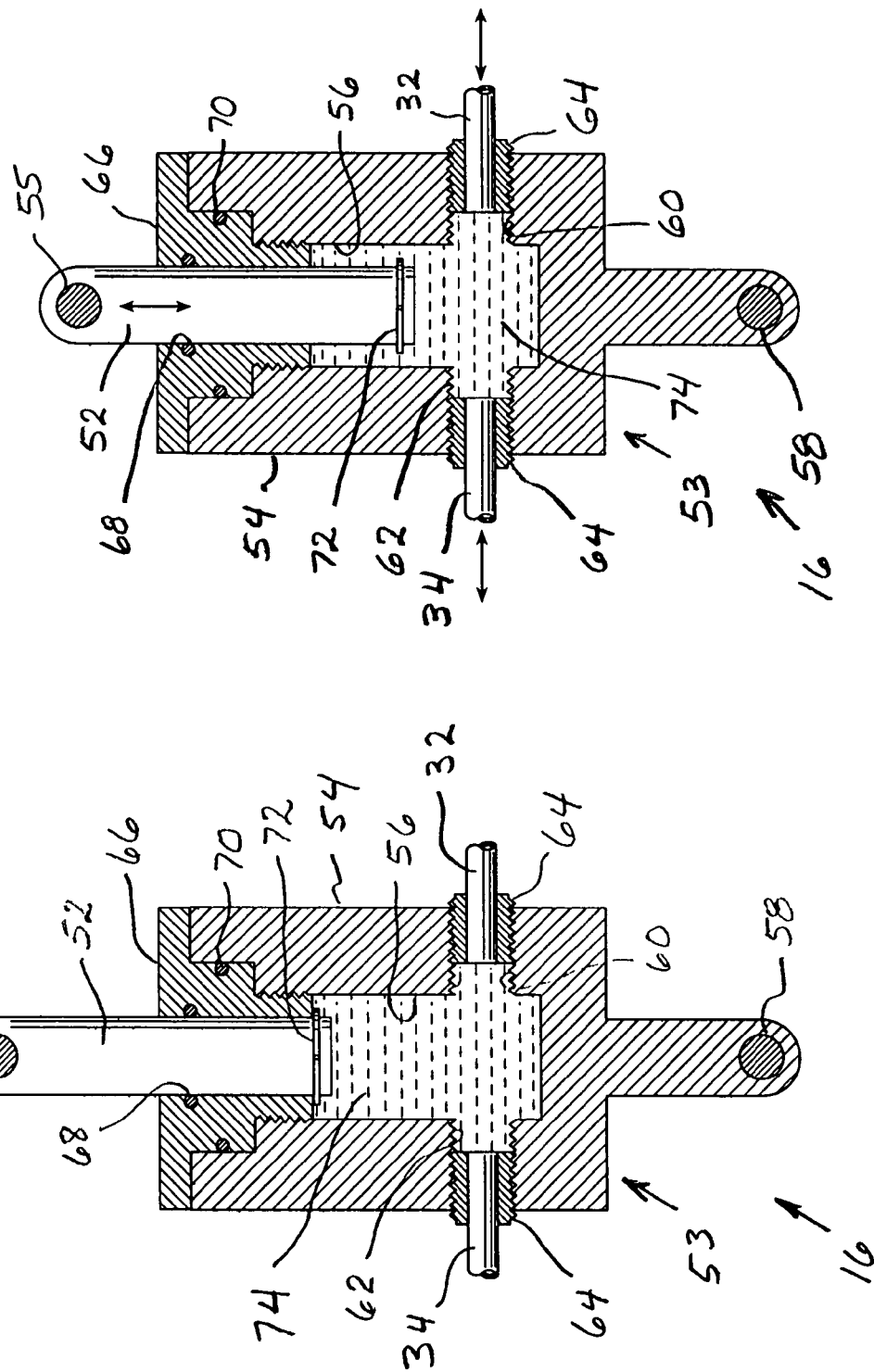
FIG. 2 is a sectional elevational view of the vertical acceleration sensor employed in the embodiment of FIG. 1, shown in the condition in which the vehicle wheel has moved vertically downwardly relative to the vehicle frame.

The vertical acceleration compensator 16 of the embodiment of the invention illustrated in FIGS. 1-2A includes first and second elements that form a variable volume compensation chamber coupled in fluid communication with the master cylinder brake fluid reservoir 28 and the fluid-actuated brake 30. In the embodiment of the invention illustrated in FIGS. 1-2A the vertical acceleration compensator 16 has a first compensation member 53 formed with a hollow, movable, cylindrical, annular body 54 that defines a generally cylindrical chamber or cavity 56 within its confines. The hollow body 54 is attached to the movable wheel mounting arm 14 at a swivel connection 58 located a spaced distance outboard from the longitudinal mounting arm axis of rotation 42.

A pair of flow communication ports 60 and 62 are defined in opposing walls of the hollow, cylindrical body 54. Externally threaded bushings 64 are engaged in the internally threaded ports 60 and 62. The brake fluid line segments 32 and 34 are fastened in fluid-tight engagement with the bushings 64 in the fluid communication ports 60 and 62, respectively. The brake line segment 32 couples the flow communication port 60 to the fluid-actuated brake 30, while the brake line segment 34 couples flow communication port 62 to the master cylinder brake fluid reservoir 28.

The second compensation member of the vertical acceleration compensator 16 is formed as a cylindrical piston anchored to the vehicle frame 10 by a swivel connection 55. The upper extremity of the hollow body 54 is internally tapped and is threadably engaged with external threads on a nipple located at the lower extremity of an annular cavity closure cap 66. The cap 66 includes a central, cylindrical passageway with a radial groove in its interior wall that receives an O-ring 68 that establishes a fluid-tight sliding seal with the piston 52. Another O-ring 70 ensures a fluid-tight sealed connection between the cap 66 and the hollow compensation member body 54.

A C-shaped clip 72 fits into a radial channel on the external surface of the piston 52 near its longitudinal extremity, remote from the swivel connection 55. The clip 72 forms a limit stop on the piston 52 that prevents the piston 52 from being completely withdrawn or detached from the first compensation member 53. The lower end of the piston 52 is laterally surrounded by brake fluid 74 that fills the variable volume cylindrical brake fluid chamber 56.

In the operation of the vertical acceleration compensator 16, the volume of the hydraulic fluid-filled acceleration compensation chamber 56 varies with relative vertical motion of the vehicle wheel 12 relative to the vehicle frame 10. If the vehicle tire 24 rolls over a pothole in the roadway 46, the vehicle wheel 12 will momentarily drop slightly, thus causing a clockwise rotation of the wheel mounting arm 14 relative to the vehicle frame 10, as indicated by the directional arrow 50 in FIG. 1. This movement draws the movable compensator member 53 away from the piston 52 to an extent determined by the angular rotational movement of the wheel mounting arm 14 about the longitudinal axis 42 in the clockwise direction 50, which in turn is determined by the depth of the pothole or other depression. The movable compensation member 53 can be drawn downwardly relative to a piston 52 up to the maximum limit at which the limit stop formed by the C-clip 72 is drawn into the contact with the bottom of the annular cap 66.

As in conventional vehicle braking and suspension systems, the brake fluid 74 is a substantially incompressible hydraulic oil. As the movable member 53 is drawn away from the piston 52, the piston 52 displaces less hydraulic brake fluid 74, thereby increasing the volume of the cylindrical hydraulic brake fluid cavity portion 56 defined within the hollow, movable member 53. The expansion of the volume of the cavity 56 creates a reduction in pressure in the brake line segment 32, thereby relaxing the clamping force of the brake calipers against the brake disc 36 and reducing the braking force on the wheel 12. The shock absorber 18 serves to dampen the relative downward vertical acceleration of the wheel 12 relative to the vehicle frame 10.

On the other hand, when the vehicle tire 24 rolls over a bump 76 or other rise in the roadway 46, pressure is raised within the hollow cavity of the brake fluid chamber 56 defined within the movable member 53. This occurs due to the rotational movement of the wheel mounting arm 14 in a counterclockwise direction indicated by the directional arrow 48 in FIG. 1. Rotation of the wheel mounting arm 14 in the counterclockwise direction 48 about the longitudinal axis 42 forces the first, movable compensation member 53 toward the second member that is the piston 52. The piston 52 thereupon displaces a greater volume of hydraulic fluid 74, as illustrated in FIG. 2A. This increases the pressure of hydraulic fluid in the line segment 32 to the brake 30, thereby increasing the clamping force of the brake calipers upon the disc 36. Thus, the braking effect upon the wheel 12 increases. Again, the shock absorber 18 produces a damping effect of the vertical acceleration of the wheel 12 relative to the frame 10.

On a typical roadway 46 there are many slight irregularities. Consequently, there are continuous minor fluctuations of vertical movement of the wheel 12 relative to the vehicle frame 10 for which manual compensation in braking force would be impossible. However, by utilizing the vertical acceleration or motion compensator 16 according to the invention, the compensating changes in braking force of the brake 30 on the wheel 12 are performed automatically and instantaneously.

Figure 3:
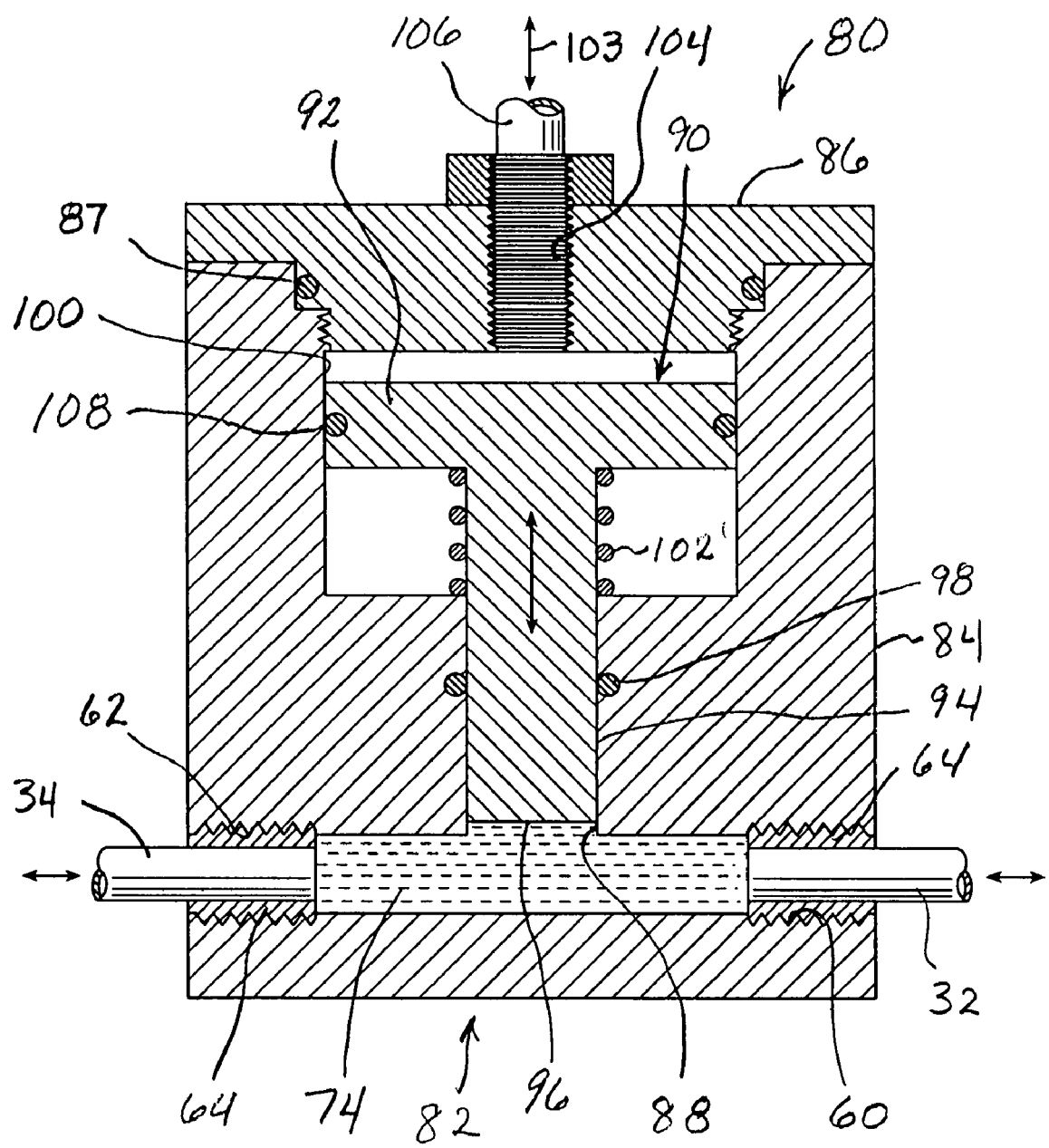
FIG. 3 is a sectional elevational view of an alternative embodiment of a vertical acceleration sensor according to the invention.

FIG. 3 illustrates an alternative embodiment of a vertical acceleration or motion compensator 80 according to the invention. The vertical acceleration compensator 80 also includes a hollow compensation member 82 formed with a hollow, cylindrical, annular body 84 closed at the top by an annular cap 86 and sealed thereto by an O-ring 87. Like the embodiment of FIGS. 1-2A, the vertical acceleration compensator 80 has a pair of diametrically opposed brake fluid ports 60 and 62 that threadably engage bushings 64 that, in turn, receive the brake line segments 32 and 34, respectively.

The hollow body 84 defines within its structure a cylindrical brake fluid cavity 88 of variable volume. Within the body 84 there is a free floating piston 90 having a disc-shaped upper extremity 92 and a cylindrical, axial section of reduced diameter that has a cross-sectional area that fits snugly within the cylindrical brake fluid chamber 88 defined within the vertical hollow acceleration compensator member 82. The flat, circular face 96 of the reduced diameter piston section 94 of the piston 90 resides in contact with the brake fluid 74. An O-ring 98 residing within a radial channel in the interior wall of the body 84 establishes a fluid-tight sliding seal connection between the lower, cylindrical end 94 of the piston 90 and the wall of the brake fluid chamber 88.

The disc-shaped upper end 92 of the piston 90 has a much larger cross-sectional area and moves in a reciprocal manner within the shock absorber fluid portion 100 of the hollow cavity formed within the body member 84. A compressed coil spring 102 urges the piston 90 in a vertical direction toward a shock absorber fluid inlet 104 in the cap 86. The inlet 104 in the cap 86 is coupled to a shock absorber fluid line 106. The shock absorber fluid line 106 extends from the shock absorber fluid port 104 to the internal chamber of the shock absorber 18 at the upper end 20 thereof. The shock absorber fluid cavity portion 100 and the brake fluid cavity portion 88 are separated and isolated from each other by the piston 90.

The fluid within the shock absorber 18 and in the variable volume shock absorber fluid portion 100 of the hollow cavity within the movable member 82 of the vertical acceleration compensator 80 is typically a compressible fluid, such as air. An O-ring seal 108 set in the outer periphery of the upper, disc-shaped portion 92 of the piston 90 creates a sliding, airtight seal between the disc-shaped portion 92 of the piston 90 and the interior cavity wall for the shock absorber fluid of the vertical acceleration compensator member 82.

In the operation of the embodiment of the vertical acceleration compensator 82 illustrated in FIG. 3, the entire structure of the vertical acceleration compensator 80 undergoes reciprocal movement with the wheel mounting arm 14, but the piston 90 moves within the compensator body 84 due to variations of the fluid pressure transmitted between the shock absorber fluid cavity portion 100 of the compensation member 82 and the interior chamber of the shock absorber, through the shock absorber fluid line 106. This transfer of shock absorber fluid is indicated by the bidirectional arrow 103 in FIG. 3 and occurs as the wheel 12 undergoes upward and downward vertical motion relative to the vehicle frame 10, as indicated by the bidirectional arrow 110 in FIG. 1. The shock absorber fluid may be hydraulic fluid, such as hydraulic oil, if the shock absorber 18 is filled with hydraulic fluid. However, the shock absorber 18 may incorporate an airspring that produces varying pneumatic pressures within its structure. This pneumatic pressure will vary with vertical acceleration of the wheel 12 relative to the vehicle frame 10. In this arrangement air is the fluid that passes through the shock absorber fluid line 106 into and out of the variable volume shock absorber fluid portion 100 of the hollow cavity within the movable member 82.

As the tire 24 encounters a pothole or other depression in the roadway 46, the lower end 22 of the shock absorber 13 is drawn away from the upper end 20, thereby reducing pneumatic pressure in the airspring which reduces pneumatic pressure in the pneumatic line 106. With a reduction of pneumatic pressure in the shock absorber fluid cavity portion 100 of the hollow body 84, the pressure of the hydraulic fluid 74 in the hydraulic fluid portion 88 of the cavity within the vertical acceleration compensator 80 pushes the piston 90 upwardly. The piston 90 is forced toward the pneumatic inlet 104 to equalize pressure between the hydraulic fluid 74 and the air in the upper part of the pneumatic fluid portion 100 of the cavity that is in communication with the pneumatic port 104. The increase in volume of the hydraulic fluid portion 88 of the cavity within the vertical acceleration compensator 80 causes a reduction in pressure to the brake 30 applied through the brake line segment 32, thereby reducing the braking force on the wheel 12.

Conversely, when the tire 24 rolls over a bump 76 or other raised irregularity in the roadway 46, the lower end 22 of the shock absorber 18 is forced toward the upper end 20 thereof. This increases hydraulic fluid pressure within the shock absorber 18 and also within the airspring. This increased pneumatic pressure from the airspring is transmitted through the pneumatic line 106 to the pneumatic fluid portion 100 of the vertical acceleration compensator cavity. Because the pressure within the shock absorber and airspring is typically less than pressure in the brake line, the disc-shaped portion 92 of the piston 90 that faces the pneumatic inlet 104 is designed to have a much greater surface area than the lower face 96 of the piston 90 that resides in contact with the hydraulic brake fluid 74.

An increase of pneumatic pressure within the pneumatic line 106 creates an elevation in pneumatic pressure in the upper part of the pneumatic fluid portion 100 of the vertical acceleration compensator cavity, thereby forcing the piston 90 away from the pneumatic inlet 104. This motion reduces the volume of the hydraulic fluid portion 88 of the vertical acceleration compensator cavity, thereby increasing hydraulic fluid pressure in the hydraulic line segment 32 to the vehicle brake 30. This increase in pressure in transformed into a momentarily increased braking force on the wheel 12.

In the vertical acceleration compensator 80 the piston 90 has a cross-sectional area that fits snugly within the cylindrical portions of the chamber or cavity defined within the body 84. Both the larger diameter upper portion 92 and the smaller diameter lower portion 94 of the piston 90 are movable in longitudinally reciprocal fashion in fluid-tight, sliding engagement within the cylindrical chamber defined within the body 84. While the construction and operation of the vertical acceleration compensator 80 differs from that of the vertical acceleration compensator 16, the pressure changes that it creates in the brake line segment 32 leading to the vehicle brake 30 are the same.

Figure 4:
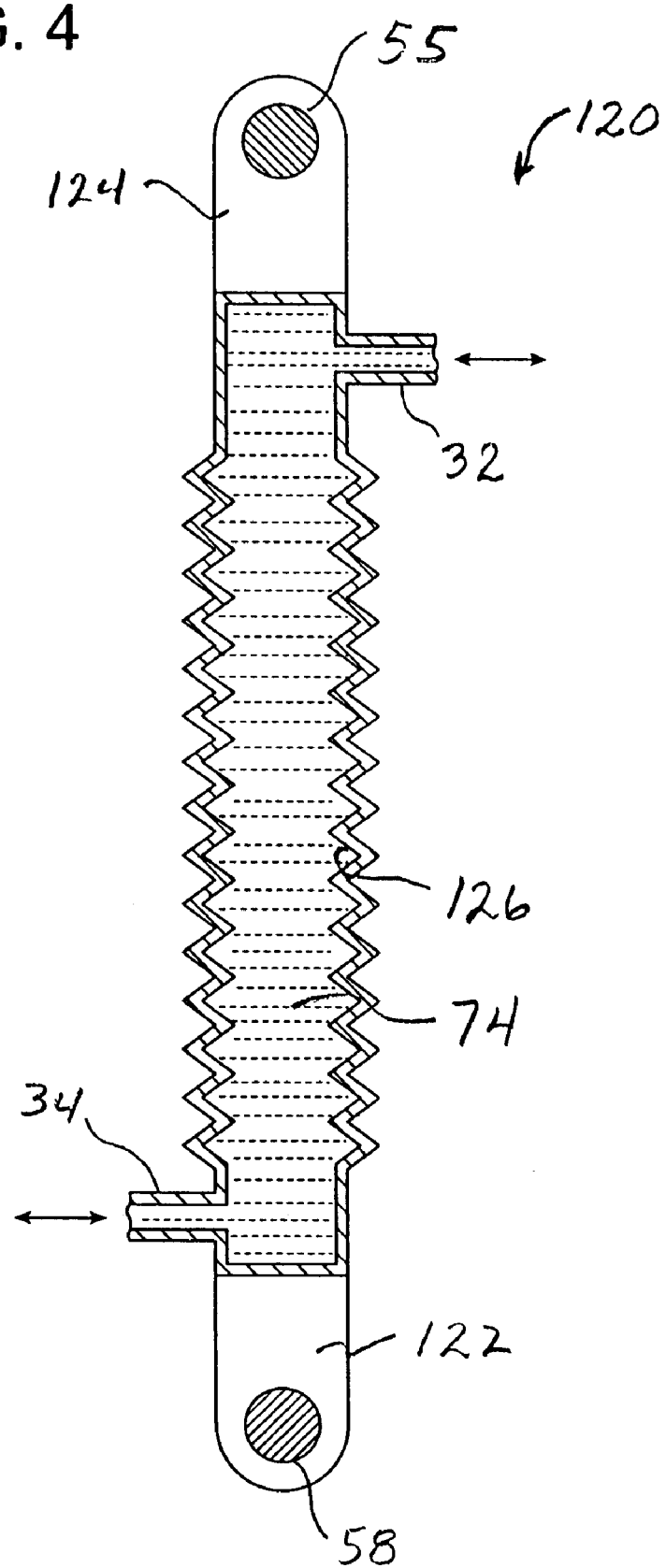
FIG. 4 is a sectional elevational view of another alternative embodiment of a vertical acceleration sensor according to the invention.

Numerous other embodiments of vertical acceleration or motion compensators according to the invention are also possible. For example, FIG. 4 illustrates another embodiment of the invention in which the vertical acceleration compensator 120 is constructed in the form of a bellows. In the vertical acceleration compensator 120 the first and second compensator elements are the lower end 122 and the upper end 124 of the bellows structure. The collapsible mid section of the bellows portion 126 forms a variable volume compensation chamber 126 which is filled with hydraulic fluid 74. The upper end 124 of the bellows 120 is coupled to the vehicle frame 10 by the upper swivel connection 55, while the lower end 122 of the bellows 120 is connected to the wheel mounting arm 14 by the swivel connection 58. A port near the lower end 122 is coupled to the brake fluid line segment 34, while at the opposite end 124 of the bellows 120, the brake fluid line segment 32 communicates with the upper end of the variable volume cavity 126.

While the vertical acceleration compensator 120 differs significantly in structure from both the vertical acceleration compensator 16 depicted in FIGS. 1-2A and the vertical acceleration compensator 80 depicted in FIG. 3, the pressure changes that it creates on the hydraulic fluid in the brake 30 are the same as those described in connection with the other embodiments of the invention.

Undoubtedly, numerous other variations and modifications of the invention will become readily apparent to those familiar with vehicle braking and suspension systems. For example, with respect to the embodiment of FIGS. 1-2A, the component elements of the vertical acceleration compensator could be reversed with the piston 52 connected to the wheel mounting arm 14 and the hollow member 53 connected to the vehicle frame 10. Other alternative embodiments of the invention are also possible. Accordingly, the scope of the invention should not be construed as limited to the specific embodiments depicted and described, but rather is defined in the claims appended hereto.

I claim:

1. A vertical acceleration compensator for sensing vertical movement of a vehicle wheel relative to a vehicle frame and coupled in fluid communication with a brake fluid reservoir and a fluid-actuated brake mechanism for said vehicle wheel comprising:
a first compensation member defining a hollow cavity therewithin coupled in flow communication with said fluid-actuated brake mechanism,
a second compensation member that occupies a variable volume brake fluid portion of said hollow cavity, and
a movable member coupled to both said vehicle frame and said vehicle wheel and responsive to vertical movement of said vehicle wheel relative to said vehicle frame to reciprocally move one of said first and second compensation members relative to the other of said compensation members to contract said variable volume brake fluid portion of said hollow cavity occupied by said second compensation member when said vehicle wheel moves vertically upwardly relative to said vehicle frame and to expand said variable volume brake fluid portion of said hollow cavity occupied by said second compensation member when said vehicle wheel moves vertically downwardly relative to said vehicle frame.

2. A vertical acceleration compensator according to claim 1 wherein one of said compensation members is anchored to said vehicle frame and said movable member is a wheel mounting arm having opposing ends wherein one of said mounting arm ends carries said wheel and the other of said mounting arm ends is attached to said vehicle frame for rotational movement relative thereto about a longitudinal axis perpendicular to the orientation of said mounting arm, and one of said compensation members is secured to said mounting arm at a spaced distance of separation from said longitudinal axis.

3. A vertical acceleration compensator according to claim 1 wherein at least a portion of said hollow cavity is formed as a cylindrical chamber and said second compensation member includes a piston that is movable in vertical reciprocation within said cylindrical chamber.

4. A vertical acceleration compensator according to claim 3 further comprising a pair of flow communication ports in said first compensation member, and one of said flow communication ports is coupled to said brake fluid reservoir and the other of said ports is coupled to said fluid-actuated brake.

5. A vertical acceleration compensator according to claim 3 wherein said movable member is a laterally projecting wheel mounting arm and said wheel is joined to said vehicle frame at one end of said mounting arm, the other end of which is hinged to said vehicle frame for rotational movement about a longitudinal mounting arm axis oriented perpendicular to said wheel mounting arm, and one of said compensation members is attached to said wheel mounting arm between said mounting arm axis and said vehicle wheel.

6. A vertical acceleration compensator according to claim 3 further comprising a limit stop on said piston that prevents said piston from being completely withdrawn from said cylindrical chamber.

7. A vertical acceleration compensator according to claim 3 wherein said piston is laterally surrounded by brake fluid within said cylindrical chamber.

8. A vertical acceleration compensator according to claim 3 wherein said piston has a cross-sectional area that fits snugly within said cylindrical chamber and is movable in longitudinally reciprocal fashion in fluid-tight, sliding engagement within said cylindrical chamber.

9. A vertical acceleration compensator according to claim 1 further comprising a shock absorber coupled to both said vehicle frame and said vehicle wheel, and said second compensation member is a piston located within said first compensation member and said first compensation member further defines a variable volume shock absorber fluid portion within said hollow cavity separated by said piston from said variable volume brake fluid portion of said hollow cavity, and further comprising a shock absorber fluid line coupled between said shock absorber and said shock absorber fluid portion of said hollow cavity in said first compensation member.

10. A vertical motion compensator for sensing vertical movement of a vehicle wheel relative to a vehicle frame, comprising:
a variable volume compensation chamber coupled in fluid communication with a brake fluid reservoir and a fluid-actuated brake mechanism wherein said vertical acceleration compensator is coupled to both said vehicle wheel and said vehicle frame, whereby upward movement of said vehicle wheel relative to said vehicle frame reduces volume of said compensation chamber and downward movement of said vehicle wheel relative to said vehicle frame increases volume of said compensation chamber.

11. A vertical motion compensator according to claim 10 further comprising a first compensator element that is a movable compensator member joined to said vehicle wheel for vertical movement therewith and a second compensator element that is a fixed compensator member anchored to said vehicle frame and said first and second compensator elements define said variable volume compensation chamber therebetween.

12. A vertical motion compensator according to claim 11 further comprising a mounting arm carrying said vehicle wheel relative to said vehicle frame and said mounting arm has an inboard end hinged to said vehicle frame for rotational movement relative thereto about a longitudinal axis perpendicular to the alignment of said mounting arm and an outboard end upon which said vehicle wheel is carried, and said movable compensator member is coupled to said mounting arm at a location thereon spaced outboard from said longitudinal axis.

13. A vertical motion compensator according to claim 12 wherein one of said fixed and movable compensator elements defines said variable volume compensation chamber therewithin as a cylindrical cavity, and the other of said fixed and movable compensator elements includes a piston movable in reciprocation within said cylindrical cavity.

14. A vertical motion compensator according to claim 10 further comprising first and second compensation elements wherein said second compensation element is a hollow structure that defines said variable volume compensation chamber as a cylindrical cavity therewithin and which also defines within its structure a shock absorber fluid cavity of variable volume, and said first compensation element includes a piston disposed within said variable volume compensation chamber and which isolates said variable volume compensation chamber from said shock absorber fluid cavity and is reciprocally movable within said second compensation element to concurrently vary the volumes of said cylindrical cavity and said shock absorber fluid cavity inversely with each other, and further comprising a shock absorber interposed between said vehicle wheel and said vehicle frame and a shock absorber fluid line providing flow communication between said shock absorber and said shock absorber fluid cavity in said second compensation element.

15. A vertical motion compensator according to claim 10 formed as a collapsible bellows that defines said variable compensation chamber within its structure and which has opposing ends coupled to said vehicle wheel and said vehicle frame.

16. A vehicle braking system with compensation for vertical movement of a vehicle wheel relative to a vehicle frame, comprising:
a closed fluid braking system including a fluid reservoir mounted on said frame, a fluid-actuated brake mounted on said vehicle wheel that is applied by increased fluid pressure and released by decreased fluid pressure, and a brake line connecting said fluid reservoir to said brake,
a vertical motion sensor comprising a hollow structure having a first member coupled to said vehicle wheel to move vertically in response to vertical movement of said wheel relative to said vehicle frame and a second member, and one of said first and second members defines therewithin a brake fluid cavity of volume that varies in response to relative movement of said first motion sensor member relative to said second motion sensor member, and said brake line is in fluid communication with said brake fluid cavity, and
hydraulic fluid that flows through said brake line between said reservoir and said brake and into and out of said brake fluid cavity of variable volume in said vertical motion sensor, whereby pressure within said brake line decreases with increasing volume within said brake fluid cavity and increases with decreasing volume within said cavity.

17. A vehicle braking system according to claim 16 wherein one of said first and second sensor members is comprised of a hollow cylinder and the other of said first and second sensor members is comprised of a piston located within said hollow cylinder and reciprocally movable therewithin to displace a variable quantity of fluid therefrom to vary said volume of said brake fluid cavity in response to vertical movement of said vehicle wheel relative to said vehicle frame.

18. A vehicle braking system according to claim 17 wherein said piston is provided with a limit stop to prevent it from becoming detached from said hollow cylinder.

19. A vehicle braking system according to claim 16 wherein said piston is a free floating structure reciprocally movable within said hollow cylinder and said hollow cylinder further defines a shock absorber fluid cavity therewithin, and said piston forms a separation barrier between said shock absorber fluid cavity and said brake fluid cavity, and further comprising a pneumatic shock absorber coupled between said vehicle wheel and said vehicle frame, and a pneumatic line coupling said shock absorber to said shock absorber fluid cavity in said hollow cylinder to enable bidirectional flow of shock absorber fluid therebetween.

20. A vehicle braking system according to claim 16 wherein said vertical motion sensor is a collapsible bellows, and said first and second members are located at opposite ends of said collapsible bellows.

* * * * *